United States Patent
Odashima et al.

(10) Patent No.: US 9,729,261 B2
(45) Date of Patent: Aug. 8, 2017

(54) TRANSMISSION APPARATUS

(71) Applicant: FUJITSU LIMITED, Kawasaki-shi, Kanagawa (JP)

(72) Inventors: Wataru Odashima, Oyama (JP); Hayato Furukawa, Kawasaki (JP); Toru Katagiri, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 189 days.

(21) Appl. No.: 14/594,207

(22) Filed: Jan. 12, 2015

(65) Prior Publication Data

US 2015/0125148 A1    May 7, 2015

Related U.S. Application Data

(63) Continuation of application No. PCT/JP2012/068430, filed on Jul. 20, 2012.

(51) Int. Cl.
*H04J 3/16* (2006.01)
*H04J 14/02* (2006.01)
*H04J 3/06* (2006.01)
*H04Q 11/00* (2006.01)

(52) U.S. Cl.
CPC .......... *H04J 3/1652* (2013.01); *H04J 3/0608* (2013.01); *H04J 3/0691* (2013.01); *H04J 14/0221* (2013.01); *H04J 2203/0067* (2013.01); *H04Q 2011/0045* (2013.01)

(58) Field of Classification Search
CPC ...... H04J 3/1652; H04J 3/0608; H04J 3/0691; H04J 14/0221
USPC ........................................................ 370/463
See application file for complete search history.

(56) References Cited

U.S. PATENT DOCUMENTS

| | | | |
|---|---|---|---|
| 9,231,721 B1* | 1/2016 | Varadarajan | H04J 3/1652 |
| 2006/0088061 A1 | 4/2006 | Roberts | |
| 2008/0131117 A1 | 6/2008 | Cho et al. | |
| 2010/0183301 A1* | 7/2010 | Shin | H04J 3/1658 |
| | | | 398/45 |
| 2010/0226648 A1* | 9/2010 | Katagiri | H04J 3/076 |
| | | | 398/66 |
| 2012/0002965 A1* | 1/2012 | Bellato | H04J 3/1652 |
| | | | 398/52 |

(Continued)

FOREIGN PATENT DOCUMENTS

| | | |
|---|---|---|
| JP | 2001-069104 | 3/2001 |
| JP | 2010-212890 | 9/2010 |

(Continued)

OTHER PUBLICATIONS

International Search Report corresponding to PCT/JP2012/068430 mailed on Oct. 23, 2012 (2 pages).

(Continued)

*Primary Examiner* — Stephen J Clawson
(74) *Attorney, Agent, or Firm* — Fujitsu Patent Center

(57) ABSTRACT

A transmission apparatus includes: a first mapping unit configured to allocate a first frame that stores a client signal to an intermediate frame; a second mapping unit configured to allocate the intermediate frame to a second frame that has a higher bit rate than a bit rate of the first frame; and a rate controller configured to control a bit rate of the intermediate frame based on the bit rate of the first frame and the bit rate of the second frame.

4 Claims, 18 Drawing Sheets

(56) References Cited

U.S. PATENT DOCUMENTS

2012/0099862 A1*  4/2012  Lin .................. H04J 3/1664
                                                    398/45
2012/0106956 A1*  5/2012  Rao .................. H04J 3/12
                                                    398/52

FOREIGN PATENT DOCUMENTS

JP    2012004839    1/2012
WO    2009090742    7/2009

OTHER PUBLICATIONS

JPOA—Office Action of Japanese Patent Application No. 2014-525634 dated May 10, 2016, with English translation of the relevant part, p. 1, line 33 to p. 2, line 5.
EESR—Extended European Search Report of corresponding European Patent Application No. 12881148.6 dated Jul. 22, 2015.
Fatai Zhang et al.; "Framework for GMPLS and PCE Control of G.709 Optical Transport Networks"; draft-ietf-ccamp-gmpls-g709-framework-02.txt; Internet Engineering Task Force, IETF; Standardworkingdaraft; Internet Society (ISOC); No. 2, Jul. 12, 2010, pp. 1-26, XP015069988.
Maarten Vissers et al.; "Proposals to extend G.709;C 107", ITU-T Draft; Study Period 2009-2012; International Telecommunication Union; vol. 11/15, Nov. 20, 2008; pp. 1-23; XP0174468006.
EPOA—Office Action of European Patent Application No. 12 881 148.6 dated Apr. 18, 2017.

* cited by examiner

FIG. 3

| | | 1 | 16 | 17 | ... | 336 | 337 | ... | 656 | ... | 3217 | ... | 3536 | 3537 | ... | 3824 |
|---|---|---|---|---|---|---|---|---|---|---|---|---|---|---|---|---|
| FRAME 1 | OH1 | | | 1 | | 320 | 1 | | 320 | | 1 | | 320 | 1 | | 288 |
| | OH2 | | | 289 | | | | | | | | | | | | 256 |
| | OH3 | | | 257 | | | | | | | | | | | | 224 |
| | OH4 | | | 225 | | | | | | | | | | | | 192 |
| FRAME 2 | OH1 | | | 193 | | | | | | | | | | | | 160 |
| | OH2 | | | 161 | | | | | | | | | | | | 128 |
| | OH3 | | | 129 | | | | | | | | | | | | 96 |
| | OH4 | | | 97 | | | | | | | | | | | | 64 |
| FRAME 3 | OH1 | | | 65 | | | | | | | | | | | | 32 |
| | OH2 | | | 33 | | | | | | | | | | | | 320 |
| | OH3 | | | 1 | | 320 | 1 | | 320 | | 1 | | 320 | 1 | | 288 |
| | OH4 | | | 289 | | | | | | | | | | | | 256 |
| FRAME 4 | OH1 | | | 257 | | | | | | | | | | | | 224 |
| | OH2 | | | 225 | | | | | | | | | | | | 192 |
| | OH3 | | | 193 | | | | | | | | | | | | 160 |
| | OH4 | | | 161 | | | | | | | | | | | | 128 |
| FRAME 5 | OH1 | | | 129 | | | | | | | | | | | | 96 |
| | OH2 | | | 97 | | | | | | | | | | | | 64 |
| | OH3 | | | 65 | | | | | | | | | | | | 32 |
| | OH4 | | | 33 | | | | | | | | | | | | 320 |

FIG. 4

| | | 1 | 16 | 17 | ... | 816 | 817 | ... | 1616 | ... | 2417 | ... | 3216 | 3217 | ... | 3824 |
|---|---|---|---|---|---|---|---|---|---|---|---|---|---|---|---|---|
| FRAME 1 | 1OH | 1 | | | | 800 | 1 | | 800 | | 1 | | 800 | 1 | | 608 |
| | 2OH | | 609 | | | | | | | | | | | | | 416 |
| | 3OH | | 417 | | | | | | | | | | | | | 224 |
| | 4OH | | 225 | | | | | | | | | | | | | 32 |
| FRAME 2 | 1OH | | 33 | | | | | | | | | | | | | 640 |
| | 2OH | | 641 | | | | | | | | | | | | | 448 |
| | 3OH | | 449 | | | | | | | | | | | | | 256 |
| | 4OH | | 257 | | | | | | | | | | | | | 64 |
| FRAME 3 | 1OH | | 65 | | | | | | | | | | | | | 672 |
| ... | ... | | ... | | | | | | | | | | | | | ... |
| FRAME 24 | 4OH | | 129 | | | | | | | | | | | | | 736 |
| | 1OH | | 737 | | | | | | | | | | | | | 544 |
| | 2OH | | 545 | | | | | | | | | | | | | 352 |
| | 3OH | | 353 | | | | | | | | | | | | | 160 |
| | 4OH | | 161 | | | | | | | | | | | | | 768 |
| FRAME 25 | 1OH | | 769 | | | | | | | | | | | | | 576 |
| | 2OH | | 577 | | | | | | | | | | | | | 384 |
| | 3OH | | 385 | | | | | | | | | | | | | 192 |
| | 4OH | | 193 | | | | | | | | | | | | | 800 |

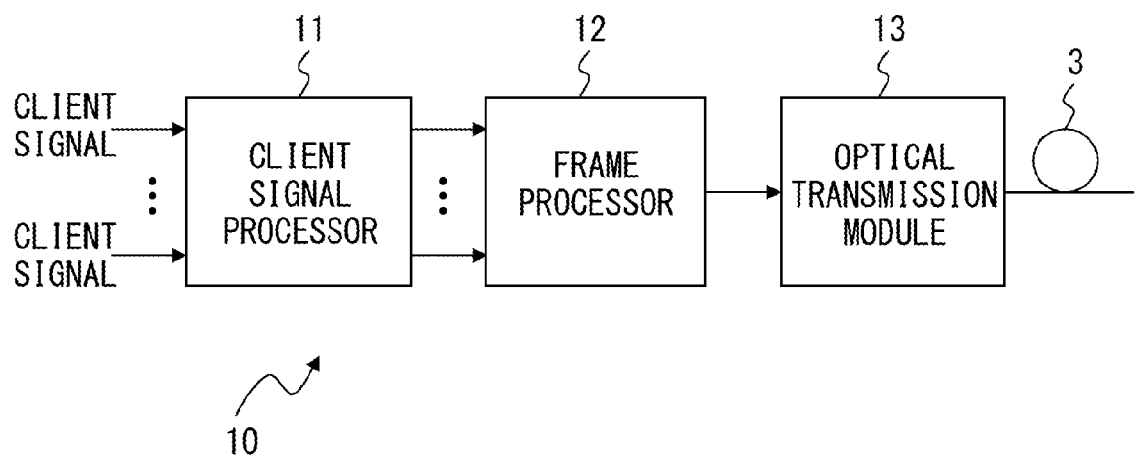
F I G. 5

FIG. 8

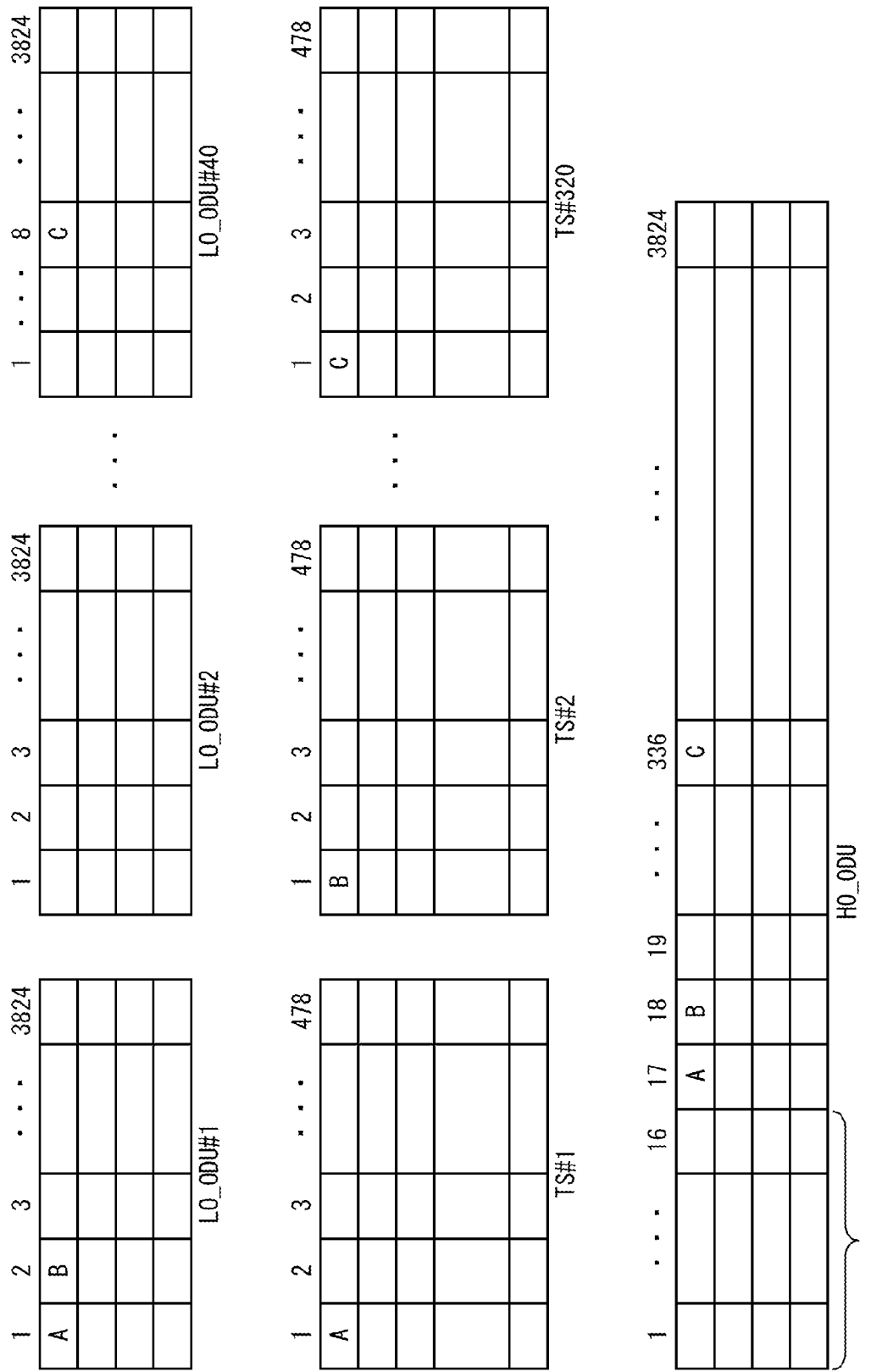

| | 1 | 16 | 17 ... | 56 | 57 ... | 96 ... | 3737 ... | 3776 | 3777 ... | 3816 ... | 3824 |
|---|---|---|---|---|---|---|---|---|---|---|---|
| 1 OH | | | 1 | 40 | 1 | 40 | 1 | 40 | 1 | 40 | fixed stuff |
| 2 OH | | | 1 | 40 | 1 | 40 | 1 | 40 | 1 | 40 | fixed stuff |
| 3 OH | | | 1 | 40 | 1 | 40 | 1 | 40 | 1 | 40 | fixed stuff |
| 4 OH | | | 1 | 40 | 1 | 40 | 1 | 40 | 1 | 40 | fixed stuff |

449.219 × (3800/4080)/40 = 10.4597 Gbps
BANDWIDTH LOSS 8/3808 = 0.21%

F I G. 1 1 A

| | 1 | 16 | 17... | 26 | 27... | 36...3797 | 3806 | 3807...3816... | 3824 |
|---|---|---|---|---|---|---|---|---|---|
| 1OH | | | 1 | 10 | 1 | 1 | 10 | 1 | 10 fixed stuff |
| 2OH | | | 1 | 10 | 1 | 1 | 10 | 1 | 10 fixed stuff |
| 3OH | | | 1 | 10 | 1 | 1 | 10 | 1 | 10 fixed stuff |
| 4OH | | | 1 | 10 | 1 | 1 | 10 | 1 | 10 fixed stuff |

449.219 × (3800/4080)/10 = 41.839 Gbps
BANDWIDTH LOSS 8/3808 = 0.21%

F I G.   1 1 B

| | 1 | ... | 16 | 17 | ... | 20 | 21 | ... | 24 | | ... | | 3821 | ... | 3824 |
|---|---|---|---|---|---|---|---|---|---|---|---|---|---|---|---|
| 1 OH | | | | 1 | | 4 | 1 | | 4 | | | | 1 | | 4 |
| 2 OH | | | | 1 | | 4 | 1 | | 4 | | | | 1 | | 4 |
| 3 OH | | | | 1 | | 4 | 1 | | 4 | | | | 1 | | 4 |
| 4 OH | | | | 1 | | 4 | 1 | | 4 | | | | 1 | | 4 |

449.219 × (3808/4080)/4 = 104.817 Gbps
NO BANDWIDTH LOSS

F I G. 11C

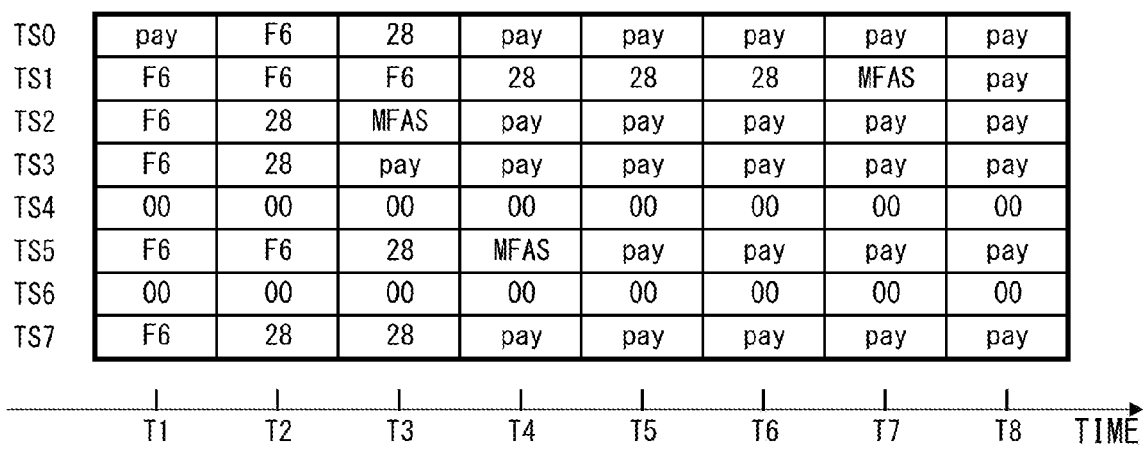
F I G. 1 3

| SORTING INFORMATION | | SORTING RESULT | | FAS DETECTION RESULT | |
|---|---|---|---|---|---|
| [0] | TS0 | pay | TS0 | 0 | TS0 |
| [2] | | F6 | | 1 | TS1 |
| [3] | | F6 | | 1 | TS2 |
| [8] | | F6 | | 0 | TS3 |
| [10] | | 28 | | 0 | TS4 |
| [11] | | 28 | | 1 | TS5 |
| [1] | TS1 | F6 | TS1 | 0 | TS6 |
| [9] | | F6 | | 0 | TS7 |
| [17] | | F6 | | | |
| [25] | | 28 | | | |
| [33] | | 28 | | | |
| [41] | | 28 | | | |
| [2] | TS2 | F6 | TS2 | | |
| [3] | | F6 | | | |
| [8] | | F6 | | | |
| [10] | | 28 | | | |
| [11] | | 28 | | | |
| [16] | | 28 | | | |
| [3] | TS3 | F6 | TS3 | | |
| [8] | | F6 | | | |
| [10] | | 28 | | | |
| [11] | | 28 | | | |
| [16] | | 28 | | | |
| [18] | | MFAS | | | |
| [4] | TS4 | 00 | TS4 | | |
| [6] | | 00 | | | |
| [12] | | 00 | | | |
| [14] | | 00 | | | |
| [20] | | 00 | | | |
| [22] | | 00 | | | |
| [5] | TS5 | F6 | TS5 | | |
| [7] | | F6 | | | |
| [13] | | F6 | | | |
| [15] | | 28 | | | |
| [21] | | 28 | | | |
| [23] | | 28 | | | |
| [6] | TS6 | 00 | TS6 | | |
| [12] | | 00 | | | |
| [14] | | 00 | | | |
| [20] | | 00 | | | |
| [22] | | 00 | | | |
| [28] | | 00 | | | |
| [7] | TS7 | F6 | TS7 | | |
| [13] | | F6 | | | |
| [15] | | 28 | | | |
| [21] | | 28 | | | |
| [23] | | 28 | | | |
| [29] | | MFAS | | | |

F I G. 1 5

TRANSMISSION APPARATUS

CROSS-REFERENCE TO RELATED APPLICATION

This application is a continuation application of International Application PCT/JP2012/068430 filed on Jul. 20, 2012 and designated the U.S., the entire contents of which are incorporated herein by reference.

FIELD

The embodiments discussed herein are related to a transmission apparatus that transmits signals in an optical network.

BACKGROUND

OTN (Optical Transport Network), which is recommended by the ITU (International Telecommunication Union), have been known as one of the standards for transmitting signals in an optical network (e.g., core network). In OTN, client data is stored in OTU (Optical channel Transport Unit) frames and is transmitted.

In recent years, further increases in speed have been needed in optical networks. In response to the need, for example, a frame generation apparatus that generates ODTU frames, a digital transmission system that provides flexible payload capacity in OTU, and a method of mapping any signals to SONET (Synchronous Optical Network) have been proposed. Note that Japanese Laid-Open Patent Application Publication No. 2010-212890, Japanese Laid-Open Patent Application Publication No. 2012-4839, and Japanese Laid-Open Patent Application Publication No. 2001-69104 are known as related art.

As described above, technologies to increase the speed of optical networks have been proposed. However, as the optical networks increases their speed, the size of a circuit that processes OTU frames increases and the power consumption may also be increased.

SUMMARY

According to an aspect of the invention, a transmission apparatus includes: a first mapping unit configured to allocate a first frame that stores a client signal to an intermediate frame; a second mapping unit configured to allocate the intermediate frame to a second frame that has a higher bit rate than a bit rate of the first frame; and a rate controller configured to control a bit rate of the intermediate frame based on the bit rate of the first frame and the bit rate of the second frame.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating a method of allocating signals of 320 tributary slots to ODU frames;

FIG. 4 is a diagram illustrating a method of allocating signals of 800 tributary slots to ODU frames;

FIG. 5 illustrates a configuration of a transmission apparatus at transmitter end;

FIG. 8 illustrates an example of mapping of LO_ODUs into HO_ODU;

FIG. 10 illustrates the other example of mapping of LO_ODUs into HO_ODU;

FIGS. 11A-11C are diagrams explaining the bit rate of tributary slots TS and bandwidth loss;

FIG. 13 is a diagram (1) explaining operations of a synchronization detector circuit;

FIG. 15 is a diagram (3) explaining operations of a synchronization detector circuit;

DESCRIPTION OF EMBODIMENTS

Figure 1:
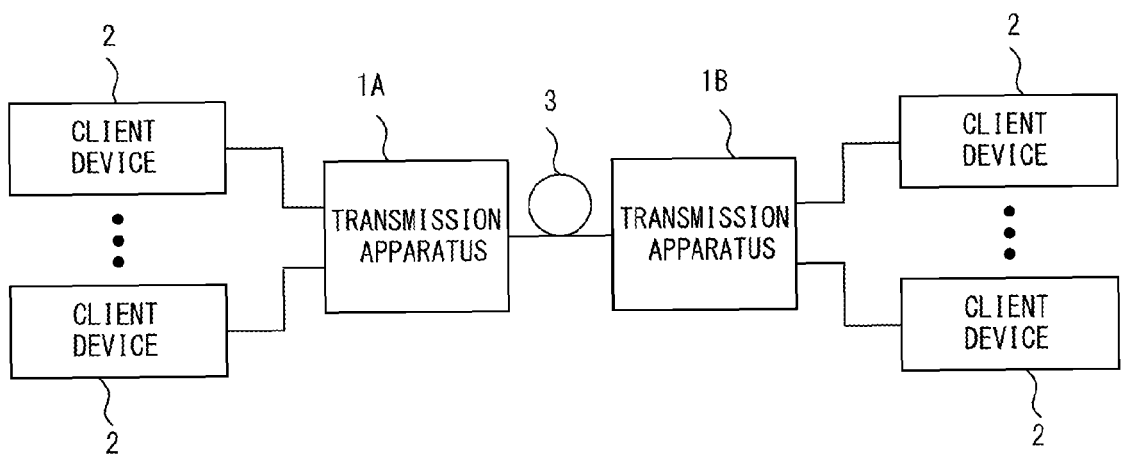
FIG. 1 illustrates an example of an optical transmission system in which a transmission apparatus of the embodiment of the present invention is used.

FIG. 1 illustrates an example of an optical transmission system in which a transmission apparatus of the embodiment of the present invention is used. Transmission apparatuses 1A and 1B can respectively accommodate a client device 2. The transmission apparatuses 1A and 1B are connected to each other by an optical transmission path 3.

The transmission apparatus 1A generates a frame that stores a client signal transmitted from the client device 2. The transmission apparatus 1A transmits this frame to the transmission apparatus 1B through the optical transmission path 3. The transmission apparatus 1B reproduces the client signal from the frame received from the transmission apparatus 1A. Afterward, the transmission apparatus 1B transfers the reproduced client signal to the corresponding client device 2.

In the following descriptions, the transmission apparatus 1A may be referred to as a transmission apparatus at transmitter end. The transmission apparatus 1B may be referred to as a transmission apparatus at receiver end. However, the transmission apparatus 1B may have a function of transmitting an optical signal to the transmission apparatus 1A. The transmission apparatus 1A may have a function of receiving the optical signal from the transmission apparatus 1B.

Figure 2:
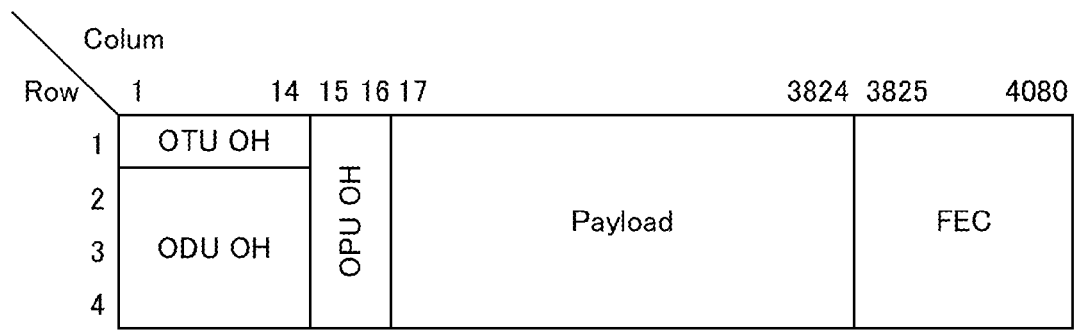
FIG. 2 is a diagram illustrating a structure of an OTU frame.

OTU frame, which is recommended by the ITU, is transmitted between the transmission apparatuses 1A and 1B. An OTU frame has a structure of 4080 bytes×4 rows as illustrated in FIG. 2. The 1st to 16th bytes store control information. The control information includes an OTU overhead, an ODU (Optical channel Data Unit) overhead, and an OPU (Optical channel Payload Unit) overhead. The 17th to the 3824th bytes are a payload section and store client signals. An FEC (Forward Error Correction) is added to the 3825th to the 4080th bytes.

An OTU frame is generated from an ODU (Optical channel Data Unit) frame. Although the OTU frame includes an FEC (Forward Error Correction), the PDU frame does not includes an FEC.

The client signals are stored in the payload of the ODU frame. Here, OTN provides plural ODU/OTU each having different bit rates. In other words, OTN provides, for example, ODU0 (1.244Gbps), ODU1 (2.498Gbps), ODU2 (10.037Gbps), ODU3 (40.319Gbps), ODU3 (104.794Gbps), and ODUflex (any bit rate). It should be noted that, for the sake of simplicity, the bit rates provided in this specification are ODU0=1.25Gbps, ODU1=2.5Gbps, ODU2=10Gbps, ODU3=40Gbps, and ODU4=100Gbps.

In OTN, ODU with a certain bit rate can be mapped into (or multiplexed into) another ODU with a different bit rate. For example, four ODU1 frames can be multiplexed into one ODU2 frame. In the following descriptions, a low-speed ODU may be referred to as "LO_ODU" and a high-speed ODU may be referred to as "HO_ODU".

In the mapping of LO_ODU into HO_ODU, tributary slots (TS) are used. In other words, LO_ODU signals are temporarily allocated in the tributary slots. The signals allocated in the tributary slots are mapped into HO_ODU.

The bit rate (or an allocation rate) of the tributary slots is fixed and is 1.25Gbps as an example. Therefore, the number of tributary slots used in the mapping of LO_ODU into HO_ODU is determined in accordance with the bit rate of HO_ODU. For example, when HO_ODU is ODU2 and its bit rate is 10Gbps, the number of tributary slots used in the mapping is 8. When HO_ODU is ODU3 and its bit rate is 40Gbps, the number of tributary slots used in the mapping is 32.

Under such conditions, further increase in the speed of optical networks has been requested. In OTN, transmission schemes that have a bandwidth of 400Gbps or 1Tbps have been explored as the next-generation standards of ODU4/OTU4. In such schemes, a transmission apparatus that transmits OTU frames will need to perform mapping of any of ODU0 to ODU4 into 400Gbps/1TGbps ODU.

For example, when HO_ODU is 400Gbps, the number of tributary slots used in the mapping is 320. In this case, the signals allocated in the tributary slots are sequentially mapped byte by byte into the payload of HO_ODU, as illustrated in FIG. 3.

In the example illustrated in FIG. 3, the signals in the tributary slots #1 to #320 are sequentially allocated in the payload of ODU frames. For example, the signals of the first 1 byte of the tributary slots #1 to #320 are allocated to the 17th to the 336th bytes in the first row of the ODU frame 1, respectively. The signals of the next 1 byte of the tributary slots #1 to #320 are allocated to the 337th to the 656th bytes in the first row of the ODU frame 1, respectively.

When HO_ODU is 1Tbps, the number of tributary slots used in the mapping is 800. In this case, the signals allocated in the tributary slots are sequentially mapped byte by byte into the payload of HO_ODU, as illustrated in FIG. 4.

As described above, the number of tributary slots increases when further increase in the speed of optical networks is achieved. However, the frame generator circuit that generates OTU frames by performing the mapping of LO_ODU into HO_ODU may include a circuit that processes the signals of plural tributary slots in parallel. For example, in the mapping of LO_ODU into HO_ODU, the frame generator circuit includes a circuit that establishes frame synchronization by using the signals allocated in the tributary slots.

When the number of tributary slots increases along with the increase in the speed of optical networks, the circuit size and power consumption of the frame generator circuit may possibly be increased. Considering this, the transmission apparatus of the embodiment described below has a function or a configuration that solve this problem.

FIG. 5 illustrates a configuration of a transmission apparatus at transmitter end. A transmission apparatus 10 has a client signal processor 11, a frame processor 12, and an optical transmission module 13. The transmission apparatus 10 is connected with a client device. It should be noted that the transmission apparatus 10 may correspond to the transmission apparatus 1A in the example illustrated in FIG. 1.

The client signal processor 11 terminates a client signal transmitted from the client device. It should be noted that the transmission apparatus 10 can accommodate plural client devices. In other words, the client signal processor 11 can terminate plural client signals.

The frame processor 12 generates OTU frames to store the client signals terminated by the client signal processor 11. At that time, the frame processor 12 generates the LO_ODU frames at first to store the client signals. Next, the frame processor 12 maps the LO_ODU frames into HO_ODU frames. In this mapping, the signals in the LO_ODU frames are temporality allocated to the tributary slots. In other words, the tributary slots are used as intermediate frames between the LO_ODU frames and the HO_ODU frames. It should be noted that the frame processor 12 can perform the mapping of plural LO_ODU frames into a single HO_ODU frame. In this case, the plural LO_ODU frames are multiplexed into an HO_ODU frame. The frame processor 12 generates an OTU frame from the HO_ODU frames.

The optical transmission module 13 generates an optical signal to transmit the OTU frame generated by the frame processor 12. The optical signal generated by the optical transmission module 13 is transmitted to the transmission apparatus at receiver end through the optical transmission path 3.

Figure 6:
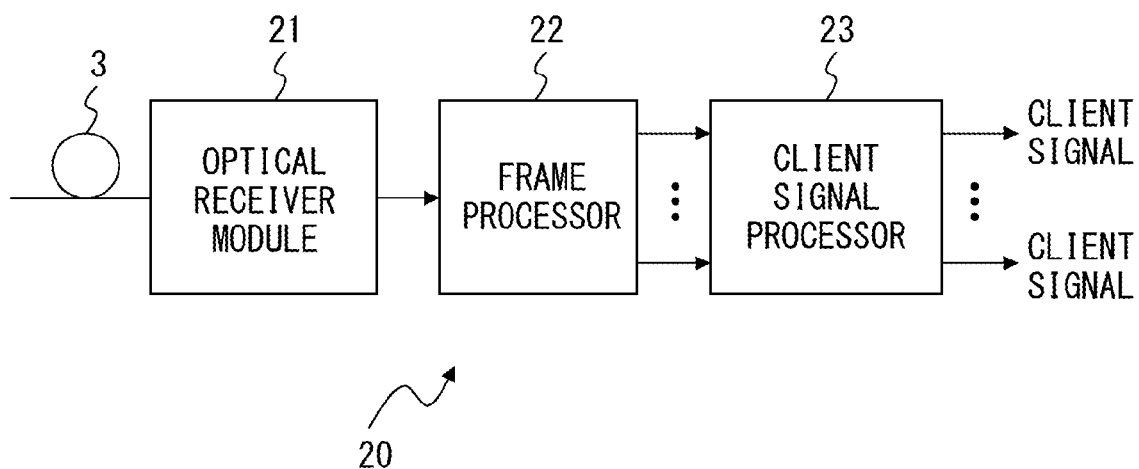
FIG. 6 illustrates a configuration of a transmission apparatus at receiver end.

FIG. 6 illustrates a configuration of the transmission apparatus at receiver end. The transmission apparatus 20 has an optical receiver module 21, a frame processor 22, and a client signal processor 23. The transmission apparatus 20 is connected with a client device. It should be noted that the transmission apparatus 20 may correspond to the transmission apparatus 1B in the example illustrated in FIG. 1.

The optical receiver module 21 receives the optical signal transmitted from the transmission apparatus at transmitter end (i.e., the transmission apparatus 10 in FIG. 5). The optical receiver module 21 converts the optical signal into electrical signal.

The frame processor 22 reproduces the OTU frame from the output signal of the optical receiver modules 21. Then the frame processor 22 reproduces the client signals by processing the OTU frame. It should be noted that the processing in which the frame processor 22 reproduces the client signals from the OTU frame is substantially the inverse processing of the processing in which the frame processor 12 generates the OTU frame from the client signals.

The client signal processor 23 transmits the client signals reproduced by the frame processor 22 to corresponding client devices. It should be noted that when plural client signals are reproduced by the frame processor 22, the client signal processor 23 transmits the client signals to the respective client devices.

It should be noted that the transmission apparatus 10 illustrated in FIG. 5 may include the optical receiver module 21, the frame processor 22, and the client signal processor 23 illustrated in FIG. 6 so as to receive optical signals from other transmission apparatuses. Similarly, the transmission apparatus 20 illustrated in FIG. 6 may include the client signal processor 11, the frame processor 12, and the optical transmission module 13 illustrated in FIG. 5 so as to transmit optical signals to other transmission apparatuses.

Figure 7:
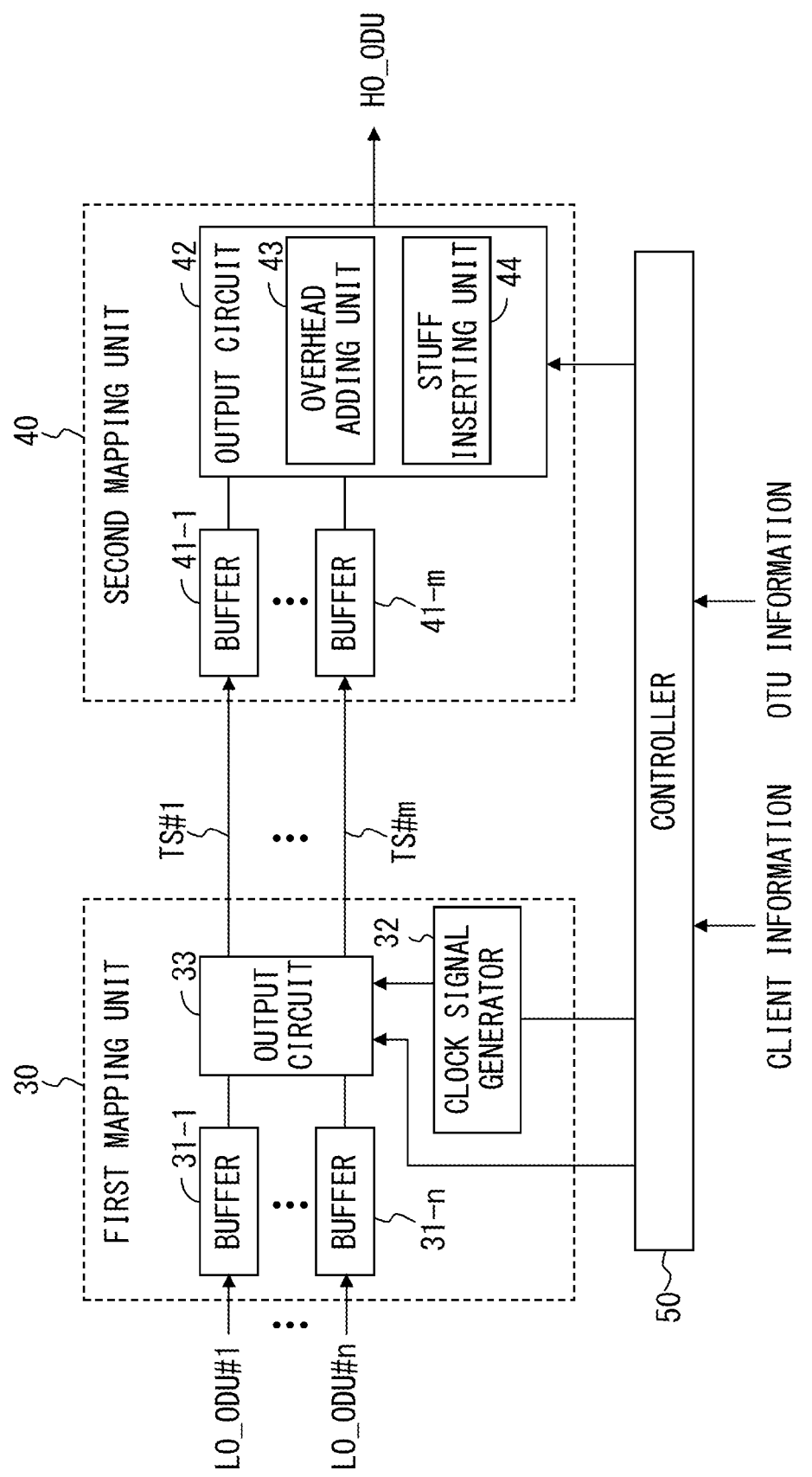
FIG. 7 is a diagram explaining a mapping function of a frame processor provided in the transmission apparatus at transmitter end.

FIG. 7 is a diagram explaining a mapping function of the frame processor 12 provided in the transmission apparatus at transmitter end. The frame processor 12 performs mapping of LO_ODU frames into HO_ODU frames as described above. In order to realize this mapping, the frame processor 12 has the first mapping unit 30, the second mapping unit 40, and a controller 50.

ODU frames are input to the first mapping unit 30 through plural LO_ODUs #1 to #n. Each LO_ODU transmits an ODU frame that stores a client signal. Here, the frame processor 12 has a function of generating an ODU frame that stores an input client signal, which is not illustrated in the drawing. For example, each LO_ODU transmits an ODU frame that stores a client signal transmitted from its corresponding client device. Alternatively, the LO_ODU frame may transmit an ODU frame that stores a multiplexed signal including plural client signals.

LO_ODUs #1 to #n are not particularly limited but are realized by ODU0, ODU1, ODU2, ODU3, ODU 4, or ODUflex. ODU2 may include ODU2 e. ODU3 may include ODU3 e. The bit rates of LO_ODUs #1 to #n are the same within one embodiment. However, the bit rates of LO_ODUs #1 to #n may not be always the same.

The first mapping unit 30 includes buffers 31-1 to 31-n, a clock signal generator 32, and an output circuit 33. The first mapping unit 30 has output ports #1 to #m, although they are not specifically illustrated. It should be noted that the first mapping unit 30 may include other circuit elements.

The buffers 31-1 to 31-n respectively store an ODU frame from received via LO_ODUs #1 to #n. At that time, the ODU frame is divided into 4×3824 frame elements, for example. In this case, each of the frame elements has 1 byte. These frame elements are sequentially written into the corresponding buffers (31-1 to 31-n) respectively. As an example, initially, the signals in the 1st byte to the 3824th byte in the first row in the ODU frame are sequentially written into the corresponding buffers. Subsequently, the signals in the 1st byte to the 3824th byte in the second row, the signals in the 1st byte to the 3824th byte in the third row, and the signals in the 1st byte to the 3824th byte in the fourth row are sequentially written in this order in the corresponding buffers.

The clock signal generator 32 generates a clock signal that has a frequency indicated by the controller 50. This frequency corresponds to the bit rate of tributary slots, which is described later. The clock signal generated by the clock signal generator 32 is supplied to the output circuit 33.

The output circuit 33 retrieves signals stored in the buffers 31-1 to 31-n by using the clock signal generated by the clock signal generator 32. At that time, for example, the output circuit 33 retrieves the signals byte by byte from the buffers 31-1 to 31-n. The output circuit 33 guides the signals retrieved from the buffers 31-1 to 31-n to the corresponding output ports #1 to #m in accordance with the instructions provided by the controller 50.

In one embodiment, the number of LO_ODUs #1 to #n and the number of the output ports #1 to #m are the same. In other words, n=m. In this case, the output circuit 33 guides the signals retrieved from the buffers 31-1 to 31-n to the corresponding output ports #1 to #m.

The output ports #1 to #m correspond to tributary slots TS #1 to #m, respectively. In other words, the signals output through the output ports #1 to #m are respectively allocated to the tributary slots TS #1 to #m.

Here, the output signals of the output ports #1 to #m are written in buffers 41-1 to 41-m of the second mapping unit 40, which is described later. Therefore, in this embodiment, "allocating to tributary slots" may be realized as a result of the processing of writing the output signals of the output ports #1 to # in the buffers 41-1 to 41-m, for example. However, the processing of retrieving signals from the buffers at a rate designated as a bit rate of tributary slots is also an example of "allocating to tributary slots". In other words, "allocating to tributary slots" is not limited to the processing of storing signals in memories etc.

In this manner, the first mapping unit 30 allocates the signals of LO_ODUs #1 to #n to the tributary slots TS #1 to #m. Here, the bit rate of the tributary slots TS #1 to #m is designated by the controller 50 as explained later.

The second mapping unit 40 includes buffers 41-1 to 41-m and an output circuit 42. The buffers 41-1 to 41-m store the signals of the tributary slots TS #1 to #m, respectively.

The output circuit 42 retrieves the signals stored in the buffers 41-1 to 41-m by using the clock signal with a specified frequency. This frequency corresponds to the bit rate of the OTN frame transmitted by the transmitter apparatus 10. At that time, the output circuit 42 sequentially retrieves the signals from the buffer 41-1 to 41-m byte by byte, for example.

The output circuit 42 includes an overhead adding unit 43 and a stuff inserting unit 44. The overhead adding unit 43 generates an overhead of an ODU frame. It should be noted that the ODU frame payload stores signals retrieved from the buffers 41-1 to 41-m. The stuff inserting unit 44 adds stuff bits at the end of the payload of an ODU frame, if necessary. The output circuit 42 outputs the generated an ODU frame as a HO_ODU frame.

It should be noted that the transmission apparatus 10 generates an OTU frame from the HO_ODU frame output from the second mapping unit 40. The OTU frame has FEC as illustrated in FIG. 2.

The controller 50 controls the first mapping unit 30 and the second mapping unit 40 based on the OTU information and the client information. The OTU information includes information indicating the bit rate of the OTU frame transmitted by the transmission apparatus 10. The client information includes information indicating the bit rate of each of the input client signals as illustrated in FIG. 5. It should be noted that the transmission apparatus 10 receives the OTU information and the client information from a network administrator or a network user, for example.

The controller 50 recognizes the bit rate of HO_ODU based on the OTU information. Here, an OTU frame has 4×4080 bytes as illustrated in FIG. 5. On the other hand, an ODU frame has 4×3824 bytes since it does not have FEC. Accordingly, the bit rate of OTU corresponds to the bit rate of HO_ODU, but is not the same as the bit rate of HO_ODU. However, in the following descriptions, the bit rate of HO_ODU and the corresponding bit rate of OTU are the same for the sake of simplicity. For example, when the bit rate of OTU is 400Gbps, the corresponding bit rate of HO_ODU is 400Gbps.

The controller 50 also recognizes a bit rate of each of LO_ODUs #1 to #n based on the client information. For example, when the client signals is 10 GbE, the controller 50 determines that the corresponding LO_ODU is "ODU2 e".

The controller 50 determines the bit rate (or the allocation rate) of the tributary slots TS #1 to #m based on the bit rates of LO_ODUs #1 to #n and the bit rate of HO_ODU, for example. In the following descriptions, the bit rates of the tributary slots TS #1 to #m are the same for the sake of simplicity.

When the bit rate of HO_ODU is H, and the bit rate of tributary slots TS #01 to #m is M, the bit rate and the number of tributary slots TS are determined so as to satisfy an equation H=m×M. For example, when the bit rate of HO_ODU is 400Gbps, the tributary slots TS #1 to #m are realized by "10Gbps×40", "40Gbps×10", or "100Gbps×4".

It should be noted that as described above, the bit rates (1.25Gbps, 10Gbps, 40Gbps, 100Gbps, 400Gbps etc.) described in this specification are not the exact values, but are the approximate values. For example, "10Gbps" indicates approximately 10Gbps, and "40Gbps" indicates approximately 40Gbps. In addition, the above provided equation "H=m×M" indicates an approximate relationship.

The bit rates of the tributary slots TS #1 to #m are determined to be higher than or equal to the bit rates of LO_ODUs #1 to #n, for example. As an example, when each client signal is 10 GbE, the tributary slots TS #1 to #m are realized by "10Gbps×40". It should be noted that when each client signal is 10 GbE, the tributary slots TS #1 to #m may be realized by "40Gbps×10" or "100Gbps×4". However, in this case, a preferable configuration is such that a multiplexed signal of plural client signals (or plural LO_ODUs) is allocated in a single tributary slot TS.

The controller 50 controls the first mapping unit 30 and the second mapping unit 40 based on the bit rate of tributary slots TS #1 to #m determined in the above manner. In other words, the clock signal generator 32 generates a clock signal with a frequency that corresponds to the bit rate of the tributary slots TS #1 to #m. The output circuit 33 retrieves and outputs the signals from the buffers 31-1 to 31-n by using this clock signal. As a result, the signals of the LO_ODUs #1 to #n are allocated to the tributary slots TS #1 to #m. The second mapping unit 40 generates an HO_ODU frame from the signals allocated to the tributary slots TS #1 to #m.

Note that the controller 50 may be implemented by a processor system. In this case, the processor system includes a processor element and a memory. The processor element may execute a given program to provide the function described in this embodiment. The program may be stored in the memory. However, the controller 50 may be implemented by using a hardware circuit or may be implemented by a combination of hardware and software.

Figure 8:
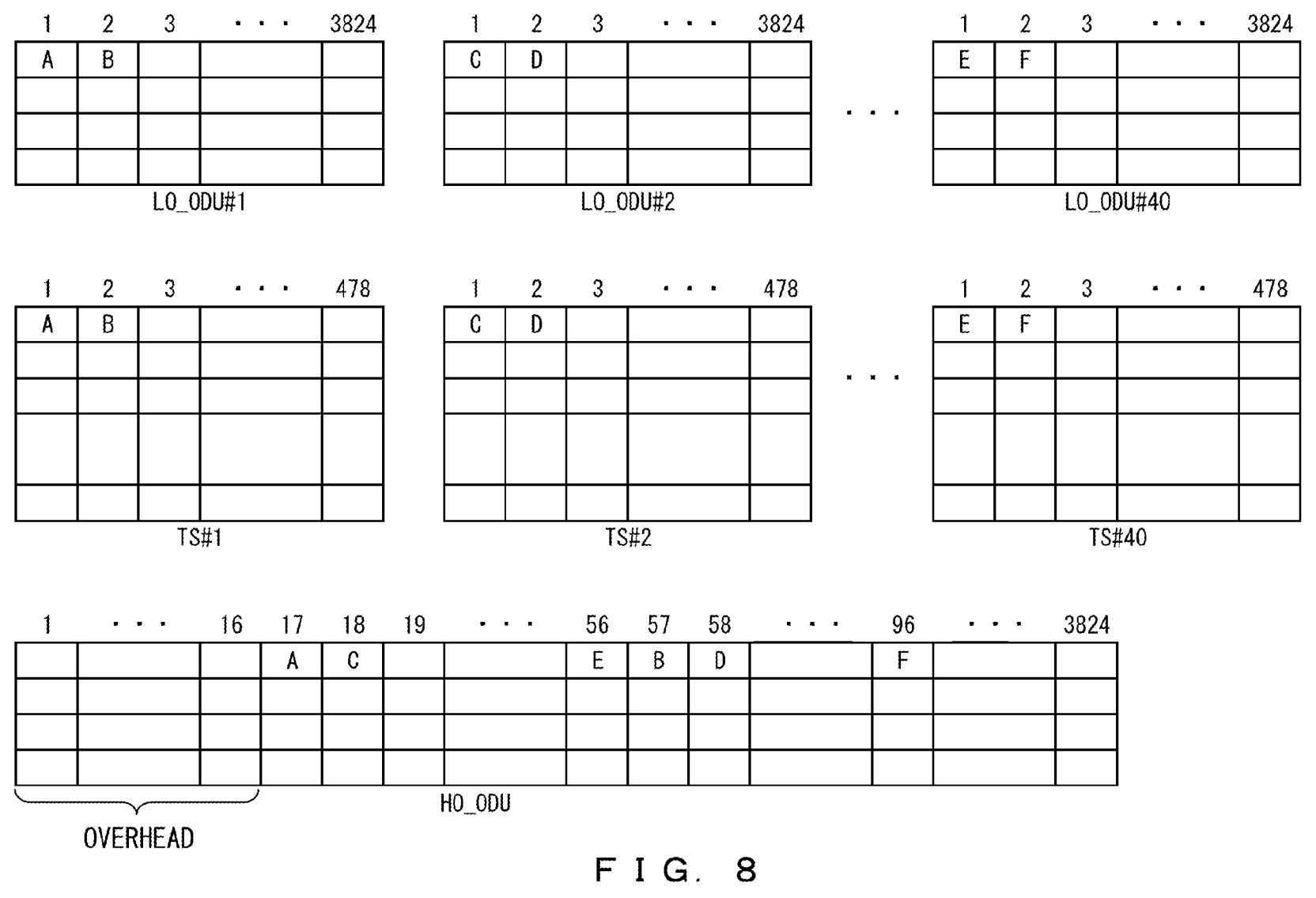

FIG. 8 illustrates an example of mapping of LO_ODU into HO_ODU. In this example, the client signals #1 to #40 are input to the transmission apparatus 10. Each of the client signals #1 to #40 is 10 GbE. In other words, ODU2 e frames #1 to #40 are input in parallel as LO_ODUs #1 to #40 to the first mapping unit 30 illustrated in FIG. 7. The bit rate of HO_ODU is 400Gbps. The tributary slots TS #1 to #m are realized by "10Gbps×40". In other words, m=40 and the bit rate of each of the tributary slots TS #1 to #40 is 10Gbps.

The LO_ODU frames #1 to #40 are sequentially stored in the corresponding buffers 31-1 to 31-n. For example, the signals in the LO_ODU frames #1 are sequentially stored in the buffer 31-1.

The output circuit 33 retrieves signals of the first byte (i.e., the first frame element) from each of the buffers 31-1 to 31-n by using the clock signal generated by the clock signal generator 32. In FIG. 8, frame elements A, C, and E are retrieved from LO_ODUs #1, #2, and #40, respectively. The frequency of the clock signal corresponds to the bit rate of the tributary slots TS #1 to #40 as described above. The output circuit 33 allocates the frame elements retrieved from the buffers 31-1 to 31-n to the corresponding tributary slots TS #1 to #40, respectively. In FIG. 8, the frame elements A, C, and E are allocated to the head of each of the tributary slots #1, #2, and #40, respectively.

The output circuit 33 retrieves signals of the next byte (i.e., the second frame element) from each of the buffers 31-1 to 31-n in the next clock cycle. Then, the output circuit 33 allocates the frame elements retrieved from the buffers 31-1 to 31-n to the corresponding tributary slots TS#1 to #40, respectively. In FIG. 8, the frame elements B, D, and F are retrieved from the LO_ODU frames #1, #2, and #40, respectively. The frame elements B, D, and F are allocated to the second section of the tributary slots TS #1, #2, and #40, respectively.

In the following descriptions, similarly, the output circuit 33 retrieves frame elements from each of the buffers 31-1 to 31-n in each clock cycle. The output circuit 33 allocates the frame elements retrieved from the buffers 31-1 to 31-n to the corresponding tributary slots TS #1 to #40. It should be noted that the tributary slots TS are 32×478 bytes in this example, although it is not limited to this capacity.

The second mapping unit 40 allocates the signals (frame elements) allocated to the tributary slots TS #1 to #40 to the payload of the HO_ODU frame. In other words, the second mapping unit 40 allocates the frame elements allocated to the tributary slots #1 to #40 sequentially to the 16th to the 3824th bytes of the HO_ODU frame. At that time, in the example illustrated in FIG. 7, the signals in the tributary slots TS #1 to #40 are temporarily stored in the buffers 41-1 to 41-m and afterwards, the signals are sequentially retrieved by the output circuit 42.

In the example illustrated in FIG. 8, the frame elements respectively allocated to the head of the respective tributary slots TS #1 to #40 are sequentially allocated to the 17th to the 56th bytes in the first row of the HO_ODU frame. For example, the frame elements A, C, and E, each allocated to the head of the respective tributary slots TS #1, #2, and #40, are allocated to the 17th, the 18th, and the 56th bytes in the first row of the HO_ODU frame.

Next, the second frame elements that are respectively allocated in the tributary slots TS #1 to #40 are sequentially allocated to the 57th to the 96th bytes in the first row of the HO_ODU frame. For example, the frame elements B, D, and F each allocated as the second frame elements of the tributary slots TS #1, #2, and #40, respectively, are allocated to the 57th, the 58th, and the 96th bytes in the first row of the HO_ODU frame.

Then the subsequent data elements of the tributary slots TS #1 to #40 are allocated to the remaining payload section of the HO_ODU frame in the similar manner. At that time the stuff inserting unit 44 may insert the stuff at the end of the payload section of the HO_ODU frame, if necessary.

Figure 9:
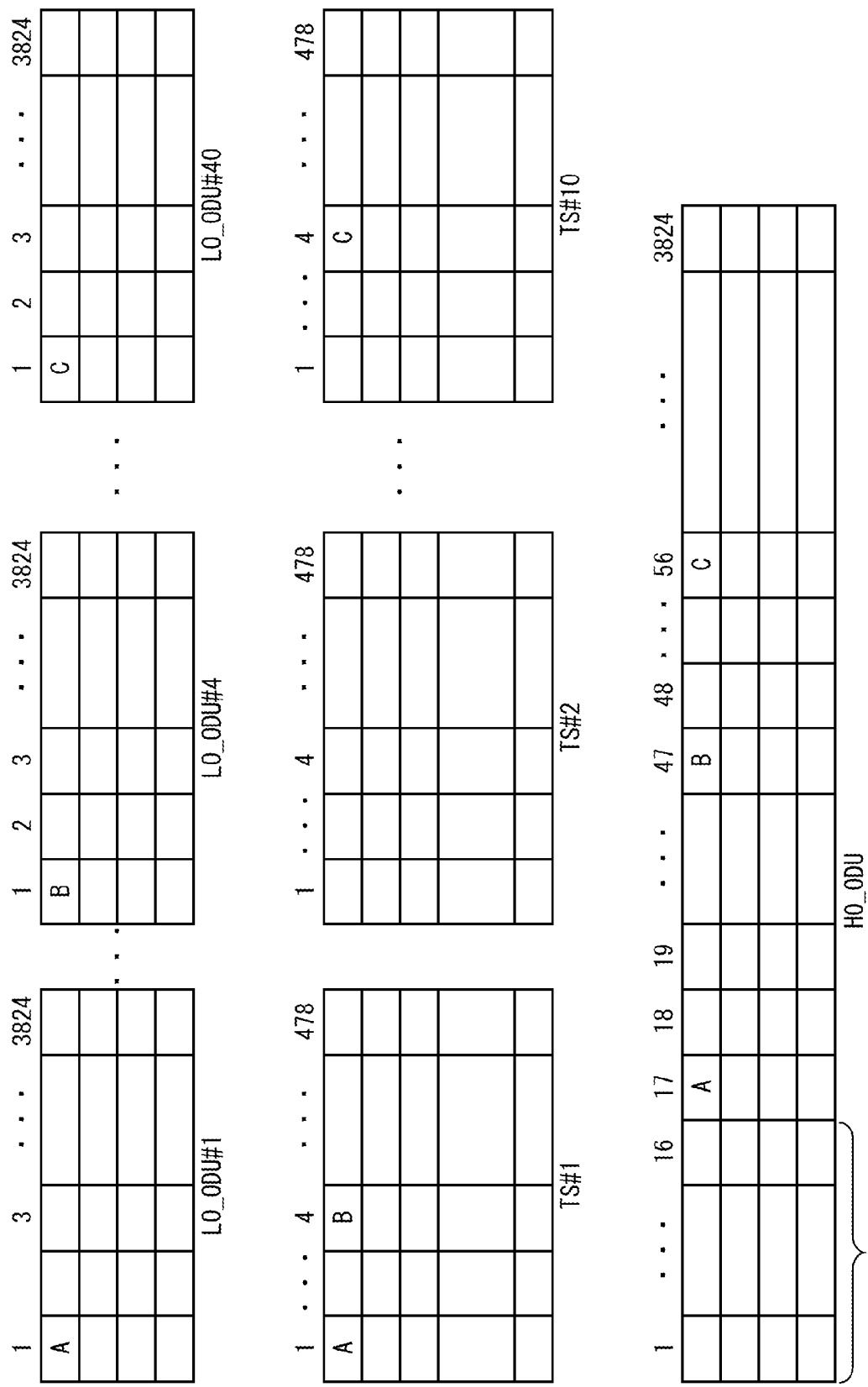
FIG. 9 illustrates another example of mapping of LO_ODUs into HO_ODU.

FIG. 9 illustrates another example of mapping of LO_ODU into HO_ODU. In this example, the client signals #1 to #40 are input to the transmission apparatus 10. Similarly to the example in FIG. 8, each of the client signals #1 to #40 is 10 GbE. In other words, ODU2 e frames #1 to #40 are input in parallel as LO_ODUs #1 to #40 to the first mapping unit 30 in FIG. 7. The bit rate of HO_ODU is 400Gbps similarly to the example in FIG. 8. However, the tributary slots TS #1 to #m are realized by "40Gbps×10", which is different from the example in FIG. 8. In other words, m=10, and the bit rate of each of the tributary slots TS #1 to #10 is 40Gbps.

The output circuit 33 retrieves signals of the first byte (i.e., the first frame element) from each of the buffers 31-1 to 31-n by using the clock signal generated by the clock signal generator 32. In FIG. 9, frame elements A, B, and C are retrieved from the LO_ODU frames #1, #4, and #40, respectively. However, the frequency of the clock signal corresponds to the bit rate of the tributary slots TS #1 to #10 (i.e., 40Gbps). The output circuit 33 allocates the frame elements retrieved from the buffers 31-1 to 31-n to the corresponding tributary slots TS #1 to #10, respectively.

At that time, the output circuit 33 multiplexes 4 LO_ODUs and allocates them to the corresponding tributary slot TS. For example, the output circuit 33 multiplexes LO_ODUs #1 to #4 and allocates them to the tributary slot TS #1. More specifically, the frame element A placed at the head of LO_ODU #1 is allocated to the head of the tributary slot TS #1, and the frame element B placed at the head of LO_ODU #4 is allocated to the fourth section of the tributary slot TS #1. In addition, the frame element C placed at the head of LO_ODU #40 is allocated to the fourth section of the tributary slot #10. It should be note that the frame element placed at the head of LO_ODU #37 is allocated to the head of the tributary slot TS #10, although it is not illustrated in the figure.

Then the output circuit 33 retrieves the subsequent frame elements from the buffers 31-1 to 31-n at every clock cycles in the similar manner. Afterwards, the output circuit 33 multiplexes the frame elements retrieved from the buffers 31-1 to 31-n and allocates them to the corresponding tributary slots TS #1 to #10.

The second mapping unit 40 allocates the signals allocated to the tributary slots TS #1 to #10 to the payload of the HO_ODU frame. In the example illustrated in FIG. 9, the frame elements each allocated to the head of the respective tributary slots TS #1 to #10 are sequentially allocated to the 17th to the 26th bytes of the first row of the HO_ODU frame. For example, the frame element A allocated to the head of the tributary slot TS #1 is allocated to the 17th byte of the first row of the HO_ODU frame.

Then the subsequent data elements of the tributary slots TS #1 to #10 are allocated to the remaining payload section of the HO_ODU frame in the similar manner. For example, the frame elements allocated as the fourth frame element of the tributary slots TS #1 to #10 are sequentially allocated to the 47th to the 56th bytes of the first row of the HO_ODU frame. At that time, the frame element B allocated as the fourth frame element of the tributary slot TS #1 is allocated to the 47th byte of the first row of the HO_ODU frame. In addition, the frame element C allocated as the fourth frame element of the tributary slot TS #10 is allocated to the 56th byte of the first row of the HO_ODU frame.

FIG. 10 illustrates the other example of mapping of LO_ODU into HO_ODU. In this example, the client signals #1 to #40 are input to the transmission apparatus 10. Similarly to the examples in FIG. 8 and FIG. 9, each of the client signals #1 to #40 is 10 GbE. In other words, ODU2 e frames #1 to #40 are input in parallel as LO_ODUs #1 to #40 to the first mapping unit 30 in FIG. 7. The bit rate of HO_ODU is 400Gbps similarly to the examples in FIG. 8 and FIG. 9. However, the tributary slots TS #1 to #m are realized by "1.25Gbps×320", which is different from the examples in FIG. 8 and FIG. 9. In other words, m=320, and the bit rate of each of the tributary slots TS #1 to #320 is 1.25Gbps.

In this embodiment, the speed of the tributary slots TS is lower than LO_ODU. Therefore the signals of LO_ODU are distributed to plural tributary slots TS. For example, the signals of LO_ODU #1 are distributed to the tributary slots TS #1 to #8, and the signals of LO_ODU #40 are distributed to the tributary slots TS #313 to #320.

The output circuit 33 retrieves 8 frame elements from each of LO_ODUs #1 to #40 and allocate them to 8 corresponding tributary slots TS. For example, the output circuit 33 retrieves 8 frame elements from LO_ODU #1 and allocate them to the tributary slots TS #1 to #8. In FIG. 10, the frame elements A and B of LO_ODU #1 are allocated to the head of the tributary slots TS #1 and #2, respectively. The output circuit 33 also retrieves 8 frame elements from LO_ODU #40 and allocates them to the tributary slots TS #313 to #320. In FIG. 10, the frame element C of LO_ODU #40 is allocated to the head of the tributary slot TS #320.

The second mapping unit 40 allocates the signals allocated to the tributary slots TS #1 to #320 to the payload of the HO_ODU frame. In the example illustrated in FIG. 10, the frame elements each allocated to the head of the respective tributary slots TS #1 to #320 are sequentially allocated to the 17th to the 336th bytes of the first row of the HO_ODU frame. For example, the frame elements A, B, and C each allocated at the head of the respective tributary slots TS #1, #2, and #320, are allocated to the 17th, the 18th, and the 336th bytes of the first row of the HO_ODU frame, respectively.

FIGS. 11A-11C are diagrams explaining the calculation of the bit rate of tributary slots TS and bandwidth loss. Here, assume that the bit rate of the OTN frame transmitted from the transmission apparatus 10 is 449.219Gbps.

The signals of the tributary slots TS are allocated to the payload of the HO_ODU frame as descried above. In other words, the signals of the tributary slots TS are allocated in the 17th to the 3824th bytes of an OTU frame.

When the transmission apparatus 10 provides 40 tributary slots TS #1 to #40, as illustrated in FIG. 11A, every 40 bytes of the payload section in each row of an ODU frame are assigned to the tributary slots TS #1 to #40. Consequently, the 17th to the 3816th bytes in each row are repeatedly assigned to the tributary slots #1 to #40. Therefore, an 8-byte stuff is inserted into the end of each row of the ODU frame. In this case, the bandwidth of each of the tributary slots #1 to #40 is 10.4597Gbps. In addition, the bandwidth loss (i.e., the ratio of the stuff with respect to the bandwidth of the entire payload) is about 0.21 percent.

When the transmission apparatus 10 provides 10 tributary slots TS #1 to #10, as illustrated in FIG. 11B, every 10 bytes of the payload section in each row of an ODU frame are assigned to the tributary slots TS #1 to #10. Consequently, the 17th to the 3816th bytes in each row are repeatedly assigned to the tributary slots #1 to #10. Therefore, an 8-byte stuff is inserted into the end of each row of the ODU frame. In this case, the bandwidth of each of the tributary slots #1 to #10 is 41.839Gbps. In addition, the bandwidth loss is about 0.21 percent.

When the transmission apparatus 10 provides 4 tributary slots TS #1 to #4, as illustrated in FIG. 11C, every 4 bytes of the payload section in each row of an ODU frame are assigned to the tributary slots TS #1 to #4. Consequently, the 17th to the 3824th bytes in each row are repeatedly assigned to the tributary slots #1 to #4. Therefore, no stuff is inserted into the end of each row of the ODU frame. In this case, the bandwidth of each of the tributary slots #1 to #4 is 104.817Gbps. In addition, no bandwidth loss occurs.

Figure 12:
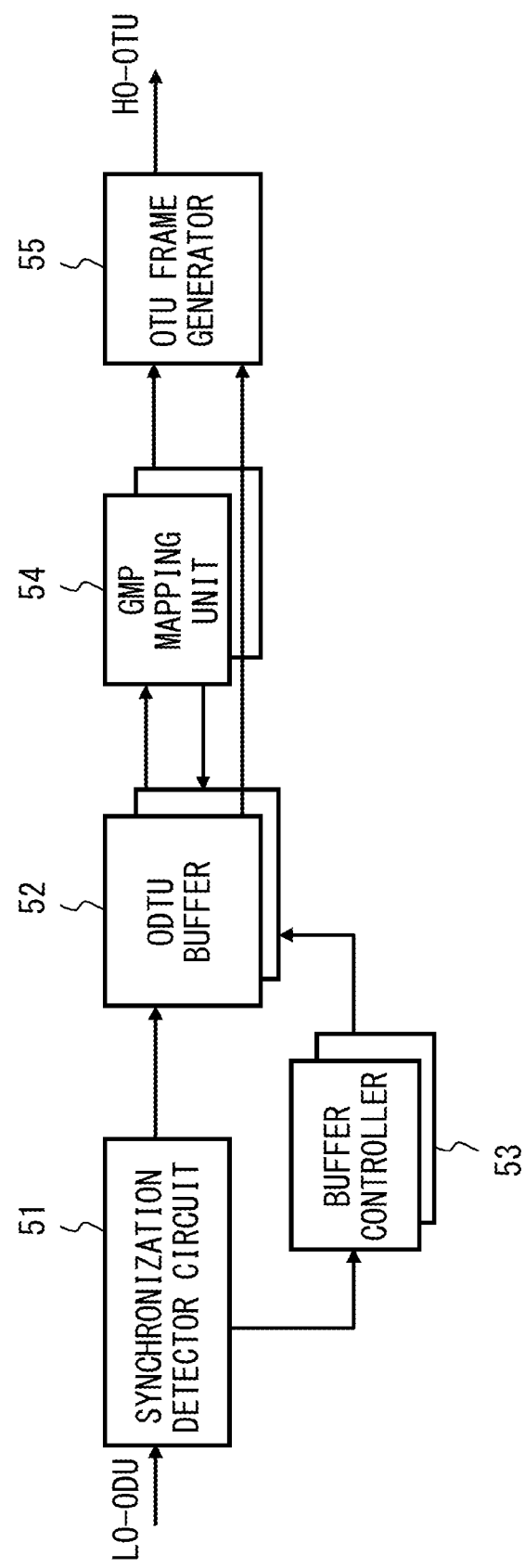
FIG. 12 is a diagram illustrating another example of a mapping function of the frame processor provided in the transmission apparatus at transmitting end.

FIG. 12 is a diagram illustrating another embodiment of the mapping function of the frame processor 12 provided in the transmission apparatus at transmitting end. In this embodiment, the frame processor 12 includes a synchronization detector circuit 51, an ODTU buffer 52, a buffer controller 53, a GMP mapping unit 54, and an OTU frame generator 55.

Plural LO_ODU frames are input in parallel to the synchronization detector circuit 51. The synchronization detector circuit 51 detects frame synchronization in the tributary slots TS. The ODTU buffer 52 sequentially stores each of the plural ODTU frames generated from the plural LO_ODU frames. The buffer controller 53 controls the timing of retrieving the ODTU frame from the ODTU buffer 52 based on the synchronizing timing detected by the synchronization detector circuit 51. The GMP mapping unit 54 controls the mapping from ODTU to HO_ODU. The OTU frame generator 55 generates an OTU frame from HO_ODU.

Figure 14:
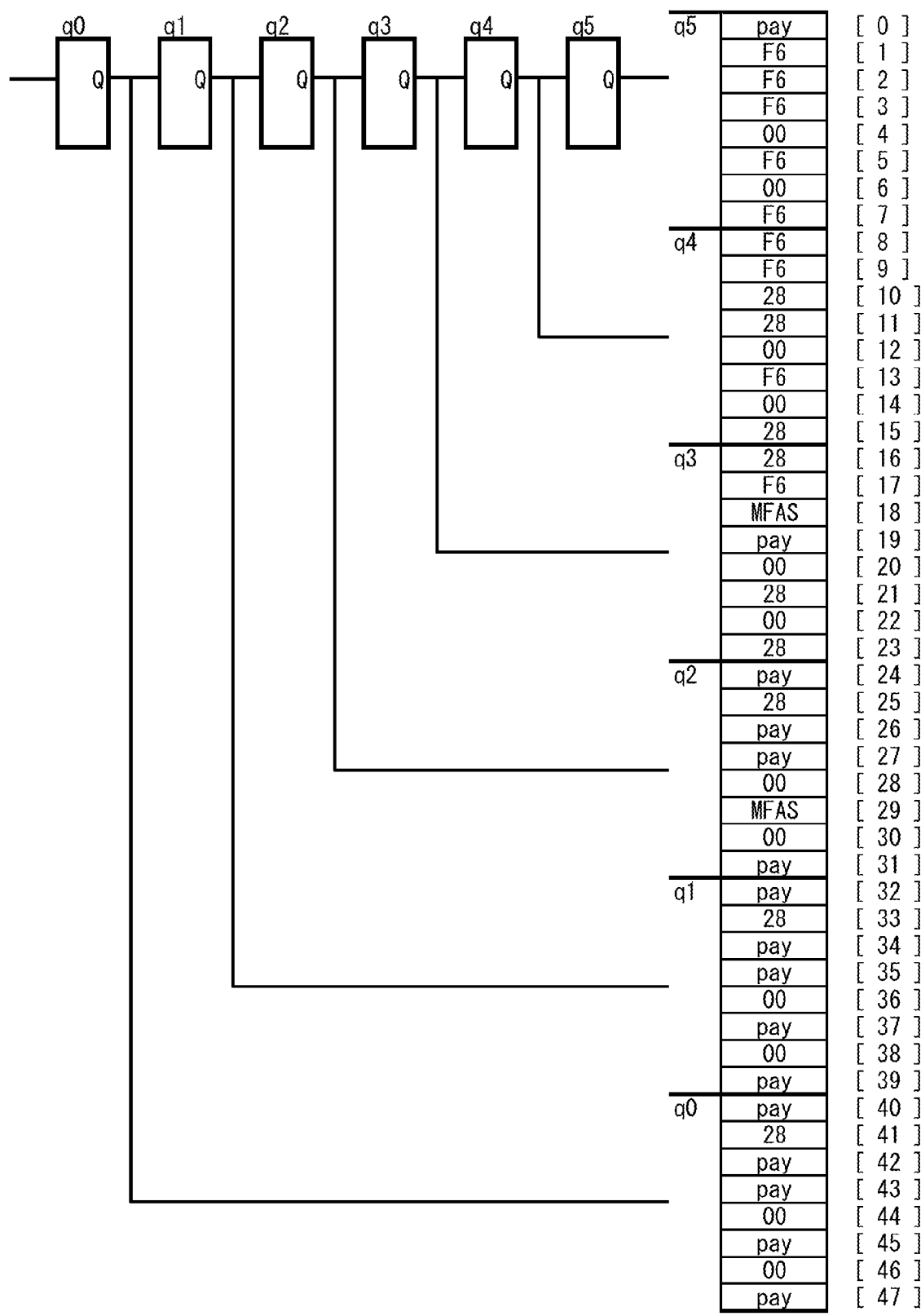
FIG. 14 is a diagram (2) explaining operations of a synchronization detector circuit.

FIG. 13 to FIG. 15 are diagrams explaining the operations of the synchronization detector circuit 51. Here, the client signals 1 to 4 are input to the transmission apparatus 10. Each of the client signals 1 to 4 is stored in the payload of an LO_ODU frame. For the sake of simplicity, 8 tributary slots TS #0 to #7 are used in the mapping from ODTU to HO_ODU. The correspondence between the client signals 1 to 4 and the tributary slots TS #0 to #7 are as below.
Client signal 1: allocated to the tributary slots #0, #2, #3
Client signal 2: allocated to the tributary slot #1
Client signal 3: allocated to the tributary slots #4, #6
Client signal 4: allocated to the tributary slots #5, #7

In this manner, the bit rate of the client signal 1 is three time faster than that of the tributary slots TS, and three tributary slots are assigned to the client signal 1. The bit rate of the client signal 2 is the same as that of the tributary slots TS, and one tributary slot is assigned to the client signal 2. The bit rates of the client signals 3 and 4 are twice faster than that of the tributary slots TS, and two tributary slots are assigned to each of the client signals 3 and 4.

6-byte FAS (Frame Alignment signal) is provided at the head of an ODU frame. FAS is provided in the OTU overhead. FAS has a fixed pattern "F6 F6 F6 28 28 28" in this embodiment.

At the time T1 in FIG. 13, 3 bytes "pay", "F6", and "F6" of the client signal 1 are allocated to the tributary slots #0, #2, and #3, respectively. One byte "F6" of the client signal 2 is allocated to the tributary slot #1. Two bytes "00" and "00" of the client signal 3 are allocated to the tributary slots #4 and #6, respectively. Two bytes "F6" and "F6" of the client signal 4 are allocated to the tributary slots "5 " and "7 ", respectively.

In the similar manner, LO_ODU that stores the client signal 1 is allocated to the tributary slots #0, #2, and #3, LO_ODU that stores the client signal 2 is allocated to the tributary slot #1, LO_ODU that stores the client signal 3 is allocated to the tributary slots #4 and #6, and LO_ODU that stores the client signal 4 is allocated to the tributary slots #5 and #7 at regular intervals. It should be noted that in FIG. 13, "MFRS" indicates Multi Frame Alignment Signal. "Pay" indicates payload data.

The synchronization detector circuit 51 has a shift register illustrated in FIG. 14. This shift register has 6 flip-flop circuits q0 to q5 to detect 6-byte synchronization information (i.e., FAS). Each of the flip-flop circuits q0 to q5 stores 8-byte information.

The signals allocated to the tributary slots TS #0 to #7 illustrated in FIG. 13 are sequentially input to this shift register. FIG. 14 illustrates a state in which the signals at the time T1, T2, T3, T4, T5, and T6 are stored in the flip-flop circuits q5, q4, q3, q2, q1, and q0, respectively.

The synchronization detector circuit 51 sorts the signals stored in the flip-flop circuits q0 to q5 for the tributary slots TS. For example, the client signal 1 is allocated to the tributary slot TS #0. Here, the client signal is also allocated to the tributary slots #2 and #3. Therefore when the tributary slot TS #0 signals stored in the flip-flop circuit q5 (i.e., the tributary slot TS #0 signals at the time T1) is the starting point, the client signal 1 is transmitted in the following order.
The TS #0 signal[0] stored in the flip-flop circuit q5
The TS #2 signal[2] stored in the flip-flop circuit q5
The TS #3 signal[3] stored in the flip-flop circuit q5
The TS #0 signal[8] stored in the flip-flop circuit q4
The TS #2 signal[10] stored in the flip-flop circuit q4
The TS #3 signal[11] stored in the flip-flop circuit q4

In the similar manner, when the tributary slot TS #2 signals stored in the flip-flop circuit q5 (i.e., the tributary slot TS #2 signals at the time T1) is the starting point, the client signal 1 will be transmitted in the following order.
The TS #2 signal[2] stored in the flip-flop circuit q5
The TS #3 signal[3] stored in the flip-flop circuit q5
The TS #0 signal[8] stored in the flip-flop circuit q4
The TS #2 signal[10] stored in the flip-flop circuit q4
The TS #3 signal[11] stored in the flip-flop circuit q4
The TS #0 signal[16] stored in the flip-flop circuit q3

The synchronization detector circuit 51 has the above sorting information for each of the tributary slots TS #0 to #8. The synchronization detector circuit 51 sorts the signals stored in the flip-flop circuits q0 to q5 based on this sorting information as described in FIG. 15. For example, when the sorting is carried out on the tributary slot TS #0, the signals identified by [0], [2], [3], [8], [10], and [11] are arranged in order, and "pay F6 F6 F6 28 28" is consequently obtained. The sorting result for each tributary slot is provided in FIG. 15.

In addition, the synchronization detector circuit 51 compares the sorting result obtained with respect to the tributary slot TS #0 with the predetermined FAS pattern "F6 F6 F6 28 28 28". In this embodiment, synchronization is detected in the tributary slots TS #1, #2, and #5 as a result of this comparison.

As described above, the synchronization detector circuit 51 detects synchronization while sequentially storing the signals in each of the tributary slots TS. Then, the frame processor 12 processes the frames based on the synchronization timing detected by the synchronization detector circuit 51.

Here, the synchronization detector circuit 51 has a shift register (the flip-flop circuits q0 to q5) as illustrated in FIG. 14. Each of the flip-flop circuits q0 to q5 stores an amount of signals that depends on the number of the tributary slots TS. For example, since the frame processor 12 uses 8 tributary slots TS #0 to #7 in the embodiment illustrated in FIG. 13 to FIG. 15, each flip-flop circuit stores an 8-byte signal. In this manner, since 40 tributary slots TS #1 to #40 are used in the embodiment illustrated in FIG. 8, each flip-flop circuit stores a 40-byte signal. In the embodiment illustrated in FIG. 10, which uses 320 tributary slots TS, each flip-flop circuit stores a 320-byte signal. The synchronization detector circuit 51 processes the signals of all the tributary slots TS in parallel.

However, as the number of signals processed in parallel increases, the adjustment of the timings in a circuit becomes difficult. In other words, when the number of the tributary slots TS increases, it will be difficult to adjust the timings within the synchronization detector circuit 51. Therefore, in consideration of the above-stated difficulty in the timing adjustment in a circuit, it would be preferable to have fewer tributary slots TS. In addition, with the reduced number of the tributary slots TS, the circuit size of the ODTU buffer 52, the buffer controller 53, and the GMP mapping unit 54, which are illustrated in FIG. 12, becomes smaller.

Considering this, the transmission apparatus of the embodiment of the present invention reduces the number of tributary slots by increasing the bit rate of the tributary slots used in mapping of LO_ODU into HO_ODU. As a result, a circuit to transmit OTU frames, which is faster than OTU4, can be realized. In addition, by reducing the number of tributary slots, the size of the circuit for frame processing becomes smaller, and power consumption is suppressed. For example, when the bit rate of tributary slots is increased from 1.25Gbps to 10Gbps, the number of tributary slots becomes 1/8, and the circuit size and/or the power consumption of the frame processor 12 are considerably reduced. In this case, the circuit sizes of the ODTU buffer 52, the buffer controller 53, and the GMP mapping unit 54, which are illustrated in FIG. 12, become approximately 1/8.

In order to reduce the number of tributary slots, it is preferable to control the bit rate of tributary slots to be higher than the bit rate of the LO_ODU frame. For example, when HO_ODU is faster than ODU4 , the bit rate of tributary slots is preferably set at a rate of ODU2 /ODU2 e or faster.

At that time, the controller 50 controls the bit rate of tributary slots to be a bit rate obtained by dividing the bit rate of HO_ODU frame by a certain integer. In the example in FIG. 9, the controller 50 controls the bit rate of tributary slots to be "10Gbps" that is obtained by dividing the bit rate of HO_ODU, i.e., 400Gbps, by "40".

In other words, when the bit rate of HO_ODU frame is H, and the bit rate of tributary slots is M, the first mapping unit 30 allocates the signals of LO_ODU frames to H/M tributary slots. In the example in FIG. 9, H=400Gbps and M=10Gbps, and the first mapping unit 30 allocates the signals of LO_ODU frames to 40 tributary slots.

It should be noted that the frame processing in the transmission apparatus 20 at receiver end is substantially equivalent to the inverse processing of the frame processing in the transmission apparatus 10 at transmitter end. Therefore, the transmission apparatus 20 at receiver end has a function of inverse mapping of the mapping in FIG. 7.

Figure 16:
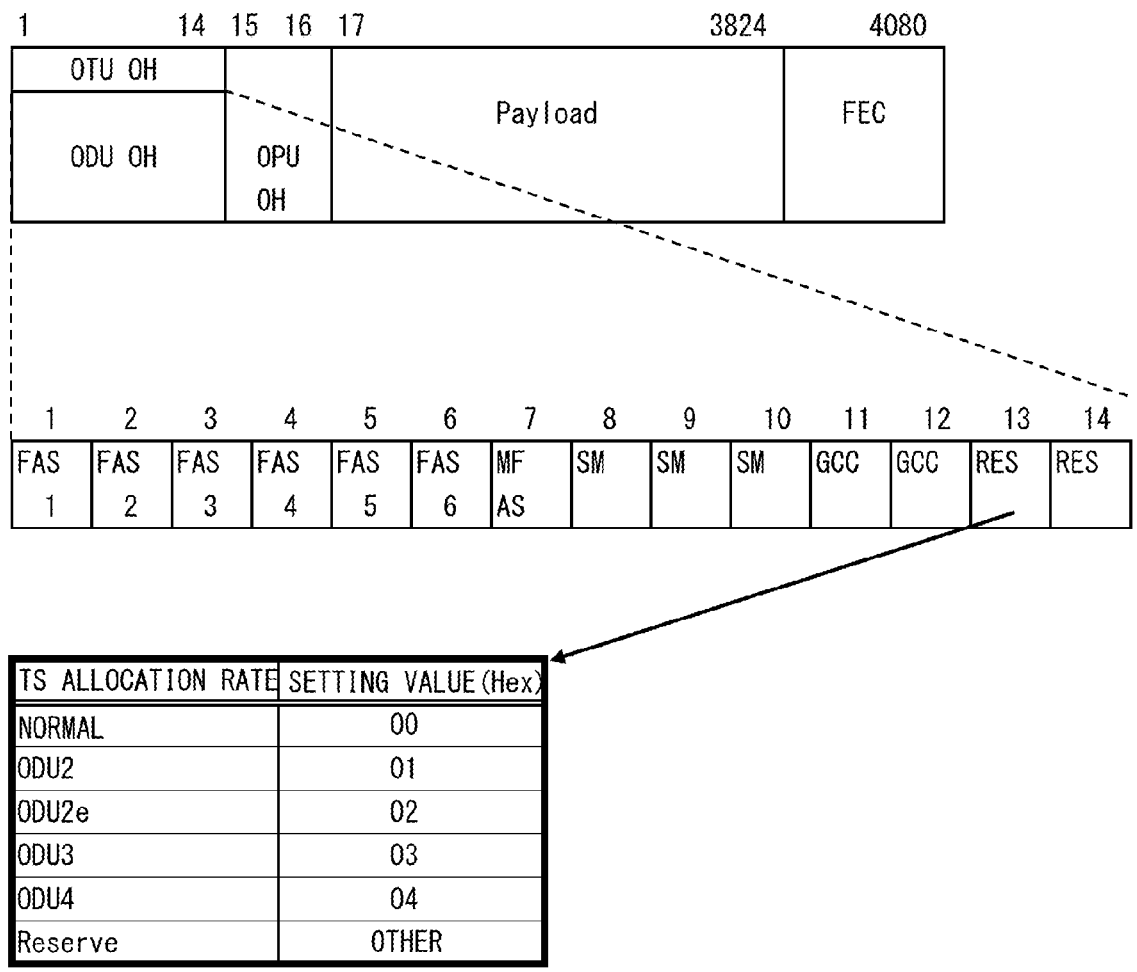
FIG. 16 is a diagram illustrating an example of a method of notifying the receiver end of an allocation rate of tributary slots.

When the allocation rate of the tributary slots TS (i.e., the bit rate of tributary slots) is changed in the transmission apparatus 10 at transmitter end, the transmission apparatus 20 at receiver end recognizes the change. As an example, the transmission apparatus 10 may notify the transmission apparatus 20 of the allocation rate of tributary slots by using the OTU overhead of an OTU frame. In this case, the allocation rate of tributary slots is indicated by using a reserved area in the 14th byte in the OTU overhead illustrated in FIG. 16. In the embodiment in FIG. 16, normal, ODU2 allocation, ODU2 e allocation, ODU3 allocation, and ODU4 allocation are identified by using 3-bit information.

"Normal" indicates that the allocation rate of tributary slots is 1.25Gbps or 2.5Gbps. "ODU2 allocation" indicates that the allocation rate of tributary slots is equivalent to ODU2 . "ODU2 e allocation" indicates that the allocation rate of tributary slots is equivalent to ODU2 e. "ODU3 allocation" indicates that the allocation rate of tributary slots is equivalent to ODU3 . "ODU4 allocation" indicates that the allocation rate of tributary slots is equivalent to ODU4.

However, the transmission apparatus 20 at receiver end may recognize the allocation rate of tributary slots in the transmission apparatus 10 at transmitter end by using other schemes. For example, a network management system may transmit information indicating the allocation rate of tributary slots to the transmission apparatuses 10 and 20.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A transmission apparatus comprising:
   a first mapping circuit that allocates a first frame in which a client signal is stored to an intermediate frame;
   a second mapping circuit that allocates the intermediate frame to a second frame, a bit rate of the second frame being higher than a bit rate of the first frame; and
   a processor that controls a bit rate of the intermediate frame based on the bit rate of the first frame and the bit rate of the second frame such that the bit rate of the intermediate frame is higher than or equal to the bit rate of the first frame and higher than 2.5 Gbps.

2. The transmission apparatus according to claim 1, wherein
   the processor controls the bit rate of the intermediate frame to be a bit rate obtained by dividing the bit rate of the second frame by an integer.

3. The transmission apparatus according to claim 1, wherein
   when the bit rate of the second frame is H and the bit rate of the intermediate frame is M, the first mapping circuit allocates a signal in the first frame to H/M intermediate frames.

4. A transmission apparatus comprising:
   a first mapping circuit that allocates a plurality of low-speed ODUs in each of which a client signal is stored to a plurality of tributary slots;
   a second mapping circuit that allocates the plurality of tributary slots to a high-speed ODU, a bit rate of the high-speed ODU being higher than a bit rate of each of the plurality of low-speed ODUs;
   a transmitter module that generates an OTU frame from a signal stored in the high-speed ODU and transmits the OTU frame to a transmission path; and
   a processor that controls a bit rate of each of the plurality of tributary slots based on the bit rate of each of the plurality of low-speed ODUs and the bit rate of the high-speed ODU such that the bit rate of each of the plurality of tributary slots is higher than or equal to the bit rate of each of the plurality of low-speed ODUs and higher than 2.5 Gbps.

* * * * *